UNITED STATES PATENT OFFICE 2,637,700

METHOD FOR PRODUCING BARIUM SALTS

Arthur C. Herbert, New Rochelle, N. Y., assignor to Barium Development Corporation, New York, N. Y., a corporation of New York No Drawing. Application June 9, 1948,
Serial No. 32,035

2 Claims. (Cl. 252—182)

My invention relates in general to a process for the production of barium salts, particularly to a process for the economic industrial production of barium carbonate from barite in a form to make it adaptable for use as an intermediate thereto, and has for its more immediate objective the provision of an improved shortened process for deriving barium carbonate from barite, in substantial yield.

A still more specific purpose is the production of a barium sulfate-carbonate complex from barite, which substance, by containing a relatively high proportion of carbonate, lends itself readily to the convenient and economical industrial production of various commercially important and valuable salts of barium, such as nitrate, chloride, etc. From this complex, (and herein for convenience of reference, called the "base") containing approximately 50% of barium carbonate, it is then possible also to derive the various indicated salts by convenient and industrially economical steps.

It is also a purpose to provide a substitute method for that of deriving various barium salts from barite through the known sulfite process which latter has the serious disadvantage of carrying troublesome sulfur impurities through to the end products.

There is the further purpose of providing a convenient and industrially economical means for producing barium salts from this sulfate-carbonate base whenever or wherever the native carbonate or witherite is not conveniently or economically available.

For the production of many various salts of barium, the carbonate is a convenient intermediate. In many such processes, however, it is not necessary to employ carbonate, per se, in isolated form but it can find ready adaptation in a mixture of the carbonate with sulfate, as developed by the process herein.

It is of practical consequence, however, when working with such a mixture of barite and barium carbonate, for the economic production of these various salts, that the carbonate be available in relatively high proportion as it is in the "base" as herein disclosed. Such essential relatively high values of carbonate are in effect attained by the herein disclosed process steps. On the industrial plane, it is quite obvious that such a mixture, containing a low value, as 20% of carbonate, for instance, would not be technically adaptable or industrially feasible for economic mass production, because of the necessity of handling relatively large amounts of material, with consequently excessive costs for transportation, labor, heating, residue disposal, and so forth.

It has been well known to produce barium carbonate from barite by fusion with sodium carbonate at temperatures of about 1750° F. It is also known to produce barium carbonate by boiling barite with strong solutions of sodium carbonate under pressure ranging from 1500 pounds to 2000 pounds per square inch. Both of these processes are industrially impractical for the main objective herein—in the latter instance, because of the high pressure and the expensive apparatus required and the time required for the reaction, which time is usually about three hours and, in the former instance, because of the high temperatures required for fusion and the concomitant costs and difficulties involved in such procedures.

It is, therefore, an important objective to avoid all the above disadvantages by providing an improved process for attaining substantially higher yields of barium carbonate from barite and with a substantial reduction in the reaction time interval, and thus to provide a simpler and cheaper industrial process for producing the instant barium sulfate-carbonate base material through economies in time, labor, material, and apparatus.

Thus, I have found, in accordance with my invention, if barite is treated with sodium carbonate, under the conditions exemplified herein, that there is produced a much higher and practical percentage of conversion, and one which can be attained in the substantially short period of about twenty to thirty minutes of boiling, and with a materially increased yield of carbonate—about 50% of theoretical.

The new process involves the preparation of two separate boiling solutions of sodium carbonate in water; grinding of the barite to a relatively fine mesh, preferably to about 200 mesh; thereafter gradually adding the comminuted barite to one of the boiling carbonate solutions and then after the boiling has continued for about ten to fifteen minutes, gradually adding the second boiling solution of carbonate to the original boiling solution of sodium carbonate containing the barite, and continuing the boiling for another similar period. Moderate agitation throughout assists in hastening the several steps of the process.

Thereafter, and while the solution is still hot, say not less than about 180° F., the supernatant liquid is drawn off to carry with it most of the salts remaining in solution, which will consist largely of sodium sulfate, unreacted sodium carbonate, and other soluble impurities.

It is then, also desirable to treat the residue in a rotary filtering apparatus, more completely to dry the residue, which should then represent a mixture of about 50% of the newly formed barium carbonate with the unreacted residue of barite.

After further washing of this mixture, the same is then available as a base for producing various barium salts from the carbonate fraction contained in the "base."

By way of a more specific illustrative practical procedure for producing the mixed "base," by a batch method I give the following as an example of that step of my process: For the reaction I supply about

|  | Parts |
|---|---|
| Barite ground | 20 |
| Soda ash (sodium carbonate) | 32 |
| Water | 75 |

Into a suitable vessel place 22 parts sodium carbonate, 50 parts of water. Heat to the boiling point. While this solution is boiling, add thereto the 20 parts of the ground barite gradually and with agitation. Continue the boiling for about ten to fifteen minutes. In the meantime, add the remaining 10 parts of soda ash to the remaining 25 parts of water, which has previously been brought to a boil. This second boiling solution of soda is added gradually to the original boil, and the boiling of the combined solutions is then continued for approximately another ten to fifteen minutes.

Thereafter, while still maintaining the elevated temperatures (which should preferably, for obtaining optimum conditions, not be permitted to fall below about 180° F., throughout), drain off the supernatant water with its contained solutes of reacted impurities like sodium sulfate and the unreacted sodium carbonate. The solid residue is washed and dried, and is then available for further processing, for the production of various salts by conventional reaction with corresponding acids.

The foregoing example is presented by way of illustration only, and not for limitation, as it will be obvious that various minor modifications therefrom may be made according to the qualities of the materials employed, and without limitation to precise relative quantities thereof, without departing from the intent and scope of the invention disclosed in this specification and in the appended claims.

The time factor may be modified somewhat by the degree of fineness to which the barite has been ground because of the corresponding increase or decrease in surface exposure of the mineral to the carbonate solution. The progression of the conversion process may be approximately checked intermittently by titration of the boiling solution for determination of sulfate therein contained.

I claim:

1. A process for producing an artificial mineral mixture of barium carbonate and barite, adapted for the manufacture of selected barium salts free from sulfide impurities, which comprises adding ground barite to a strong boiling aqueous solution of soda ash, continuing to boil the mixture for a predetermined time, then adding a further similar boiling solution, and allowing the combined mixture to boil for a further predetermined time; then removing all the liquid while still hot, washing the solid residues with hot water, maintaining throughout temperatures not less than about 180° F., and thoroughly drying the resulting barite-barium carbonate complex.

2. The process for producing an artificial mixture of native barite and barium carbonate, adapted for the manufacture of selected barium salts free from sulfide impurities, which comprises the steps of boiling a solution of about 22 parts of soda ash in about 50 parts of water, then adding thereto about 20 parts of barite mineral ground to about a 200 mesh, and continuing the boiling for about 15 minutes; preparing a separate boiling solution of about 10 parts of soda ash in about 25 parts of water and adding this boiling solution to the prepared boiling mixture and continuing the boiling of the mixed solutions for about another 15 minutes; thereafter, while still maintaining elevated temperatures, at not less than about 180° F., throughout the further steps of the process, removing all the liquid, with its contained solutes, to recover the remaining solid residues, which are then washed in hot water to remove adherent and water-soluble impurities, and drying the residual mixture of barite and barium carbonate in preparation for treatment with selected acids for the manufacture of corresponding barium salts.

ARTHUR C. HERBERT.

References Cited in the file of this patent

Thorpe's Dictionary of Applied Chemistry; vol. I; 4th ed., p. 641; Longmans, Green & Co.; New York, N. Y.; 1941.

Mellor; Comprehensive Treatise on Inorganic and Theoretical Chemistry; vol. 3; page 801; Longmans, Green & Co.; New York, N. Y. 1923.